United States Patent [19]

Suzuki et al.

[11] Patent Number: 4,794,435
[45] Date of Patent: Dec. 27, 1988

[54] PHOTOCHROMATIC GRADIENT LENS HAVING TWO COLORTONES AND PROCESS FOR PRODUCING SAME

[75] Inventors: Tetsuo Suzuki; Toshiharu Yamashita, both of Tokyo, Japan

[73] Assignee: Hoya Corporation, Tokyo, Japan

[21] Appl. No.: 802,825

[22] Filed: Nov. 29, 1985

[30] Foreign Application Priority Data

Nov. 30, 1984 [JP] Japan .................. 59-251521

[51] Int. Cl.⁴ .............................................. G02C 7/10
[52] U.S. Cl. ................................... 351/163; 65/30.11; 351/165; 351/177
[58] Field of Search ............... 351/163, 164, 165, 177; 65/30.11

[56] References Cited

U.S. PATENT DOCUMENTS

| | | | |
|---|---|---|---|
| 2,675,740 | 4/1954 | Barkley | 351/165 X |
| 4,018,965 | 4/1977 | Kerko et al. | 351/163 X |
| 4,043,781 | 8/1977 | DeMunn et al. | 351/163 X |
| 4,080,051 | 3/1978 | Krohn et al. | 351/165 |
| 4,251,278 | 2/1981 | Hares | 65/30.11 |

FOREIGN PATENT DOCUMENTS 2705372  9/1977  Fed. Rep. of Germany ...... 351/165

Primary Examiner—John K. Corbin
Assistant Examiner—Scott J. Sugarman
Attorney, Agent, or Firm—Cushman, Darby & Cushman

[57] ABSTRACT

An tinted eyeglass lens having a photochromic gradient and a process for producing the same are disclosed. The photochromic gradient is provided by changing the particle diameter of silver halide particles in the face direction of the glass.

10 Claims, 1 Drawing Sheet

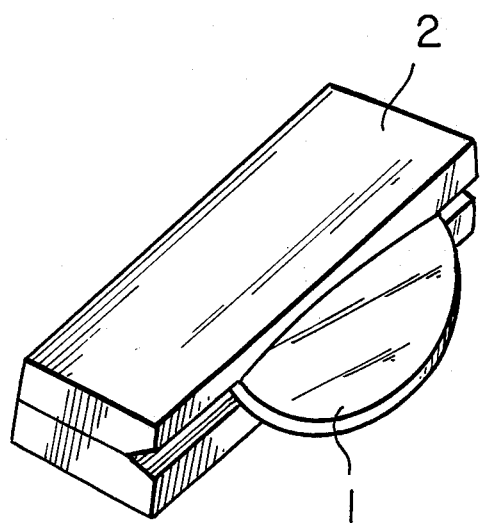

PHOTOCHROMATIC GRADIENT LENS HAVING TWO COLORTONES AND PROCESS FOR PRODUCING SAME

FIELD OF THE INVENTION

The present invention relates to an eyeglass lens and a process for producing the same. More particularly, it relates to an eyeglass lens having both fashionable properties and functional properties.

BACKGROUND OF THE INVENTION

Recently, the demand for a lens having a gradient of color density increases as an eyeglass lens having high fashionable properties, and various eyeglasses using lenses having density gradients of various colors are commercially available. Of those commercially available eyeglasses, there is an eyeglass using a lens having a photochromic gradient.

The lens having a photochromic gradient is disclosed, for example, in Japanese patent application (OPI) No. 51412/77. (The term "OPI" as used herein refers to a "published unexamined Japanese patent application".) This lens is a silver halide-based lens having a photochromic gradient which is provided by continuously changing the particle diameter of silver halide particles.

On the other hand, conventional lens having a gradient of color density use only a single color, regardless of an ordinary coloration or photochromic coloration, and the monotonousness in color greatly detracts from the fashionable properties of the lens.

SUMMARY OF THE INVENTION

Extensive investigations have been made to provide an eyeglass lens having high fashionable properties and functional properties, wherein the lens has two different colors and the color tone of the area having a gradient of color density delicately changes by the intensity of light.

Accordingly, one object of the present invention is to provide an eyeglass lens containing a silver halide having incorporated therein a coloring material, wherein the lens has a photochromic gradient which is provided by changing the particle diameter of silver halide particles in a face direction of the lens.

Another object of the present invention is to provide a process for producing an eyeglass lens having a photochromic gradient.

BRIEF DESCRIPTION OF THE DRAWING

The drawing is a perspective view showing a heat treatment method to provide a lens with a photochromic gradient.

DETAILED DESCRIPTION OF THE INVENTION

The expression "changing the particle diameter of silver halide particles in a face direction of the lens" means that the particle diameter of silver halide changes along a certain line passing the center of the lens on the face thereof.

The eyeglass lens according to the present invention comprises 100 parts by weight of a base glass composition, and as light-sensitive components, 0.15 to 1.0 part by weight of Ag, and a halogen such as Cl, Br or I in an amount corresponding to at least the chemical equivalent of Ag.

Coloring materials which strongly absorb ultraviolet light are not preferred in the present invention.

Examples of the coloring material which can be used in the present invention are $Pr_6O_{11}$, $Nd_2O_3$, $Sm_2O_3$, $Ho_2O_3$, $Er_2O_3$, CoO, NiO and the like. At least one coloring material can be introduced into a glass for eyeglass lens in an amount of at least 0.0001% by weight, with proviso that the amount of at least one of $Pr_6O_{11}$, $Nd_2O_3$, $Sm_2O_3$, $Ho_2O_3$ and $Er_2O_3$ is up to 3.0% by weight and the amount of at least one of CoO and NiO is up to 0.01% by weight.

By the introduction of the coloring material, the glass colors in the color tone of the respective coloring material as shown in the Table given after. Further, glasses having various color tones can be obtained by using a mixture of at least two coloring materials.

A glass having a photochromic gradient can be obtained by covering a part of a glass containing a silver halide having incorporated therein a coloring material with a heat insulating material and heat treating the partially covered glass.

The glass is heat treated within the temperature range between the yield point of the glass and about the softening temperature thereof. However, in order to prevent the glass from deformation and maintain the temperature difference formed by a cover such as a refractory material, it is preferred that the temperature-raising rate is faster as much as possible within the range that the glass does not break, and the retention time is shorter, e.g., 60 minutes or less.

The color tone of the glass under light irradiation can be adjusted to various colors such as brown, reddish brown, bluish grey, reddish purple, gray, greyish brown or the like by controlling the amounts of silver and halogen added and selecting the heat treatment conditions. For example, if the amount of silver is increased and the amount of halogen is decreased, the glass colors in brown and the color changes grey with increase of the amount of halogen. If the amount of silver is decreased, the glass colors in blue or grey, regardless of the amount of halogen added. When the amount of silver is large, if the heat treatment temperature is high, the glass colors in grey for a short period of time, and if the temperature is low, the glass colors in brown. If the amount of silver is small, brown color cannot be obtained depending on the heat treatment conditions.

The present invention is explained in detail by reference to the following examples.

EXAMPLES

A coloring material, silver and halogen were introduced into a glass having a basic composition shown below.

| | |
|---|---|
| $SiO_2$ | 58.6 wt % |
| $B_2O_3$ | 18.6 wt % |
| $Al_2O_3$ | 1.5 wt % |
| $ZrO_2$ | 6.4 wt % |
| $K_2O$ | 8.1 wt % |
| $Li_2O$ | 1.8 wt % |
| BaO | 3.4 wt % |
| $TiO_2$ | 1.5 wt % |
| CuO | 0.006 wt % (as a sensitizing agent) |

The molten glass was molded into a lens, and as shown in the drawing, a half of the lens 1 was covered with a heat insulating refractory 2. This half covered lens was heat treated.

The heat treatment conditions, the amounts of silver and halogen, and the type of coloring material were changed.

The color tones before irradiation and also the color changes when light irradiated in photochromic part of lens are shown in Table below.

TABLE

| | Example Nos. | | | | | | |
|---|---|---|---|---|---|---|---|
| | 1 | 2 | 3 | 4 | 5 | 6 | 7 |
| Heat treatment condition | | | | | | | |
| Temperature (°C.) | 590 | 700 | 620 | 650 | 620 | 670 | 630 |
| Time (min) | 60 | 15 | 45 | 20 | 40 | 20 | 30 |
| Amount of silver (wt %) | 0.3 | 0.3 | 0.5 | 0.6 | 0.4 | 0.4 | 0.3 |
| Amount of cl (wt %) | 0.5 | 1.0 | 0.6 | 0.4 | 0.6 | 1.6 | 0.5 |
| Coloring material | | | | | | | |
| Type | $Pr_6O_{11}$ | $Nd_2O_3$ | $Sm_2O_3$ | $Ho_2O_3$ | $Er_2O_3$ | CoO | NiO |
| Amount (wt %) | 0.5 | 0.5 | 2.0 | 1.0 | 1.0 | 0.0004 | 0.0006 |
| Color tone | | | | | | | |
| Area showing photochromic properties | Yellowish green | Dark purple | Greenish yellow | Amber yellow | Amber pink | Greenish blue | Dark reddish brown |
| Area other than the above area | Green | Greenish purple | Yellow | Yellow | Pink | Blue | Reddish brown |
| Color change of the area showing photochromic properties when light irradiated | Greenish gray | Dark purplish blue | Dark brown | Dark reddish brown | Dark reddish brown | Bluish gray | Grayish brown |

As is apparent from the Table above, the eyeglass lens according to the present invention has high fashionable two colors and also has a density gradient on the portion showing the photochromic properties. Therefore, when the ambient brightness changes, the color density increases to protect eyes. In addition, an eyeglass lens which delicately changes its color tone can be obtained as a result of combination of the inherent color of the glass by a coloring material and the color by the photochromic coloration.

While the invention has been described in detail and with reference to specific embodiments thereof, it will be apparent to one skilled in the art that various changes and modifications can be made therein without departing from the spirit and scope thereof.

What is claimed is:

1. An eyeglass lens containing a silver halide and a coloring material, said lens having a photochromatic gradient defined by variant silver halide particle diameters in a face direction of the lens; said coloring material comprising at least one material selected from the group consisting of $Pr_6O_{11}$, $Nd_2O_3$, $Sm_2O_3$, $Ho_2O_3$, and $Er_2O_3$, said silver halide having a composition such that the lens has a first color in an area showing photochromatic properties and a second color in another area, said first color changing when the lens is irradiated.

2. The eyeglass lens as in claim 1, wherein the coloring material further comprises at least one material selected from the group consisting of CoO and NiO.

3. The eyeglass lens as in claim 1, wherein the silver halide comprises about 0.3 weight % silver and about 0.5 weight % chlorine and the coloring material comprises $Pr_6O_{11}$ in a quantity of about 0.5 weight %, whereby said first color is yellowish green, said second color is green and said first color changes to greenish grey when the lens is irradiated.

4. The eyeglass lens as in claim 1, wherein the silver halide comprises about 0.3 weight % silver and about 1.0 weight % chlorine and said coloring material comprises $Nd_2O_3$ in a quantity of about 0.5 weight %, whereby said first color is dark purple, said second color is greenish purple and said first color changes to dark purplish blue when the lens is irradiated.

5. The eyeglass lens as in claim 1, wherein the silver halide comprises about 0.5 weight % silver and about 1.6 weight % chlorine and said coloring material comprises $Sm_2O_3$ in a quantity of about 2.0 weight %, whereby said first color is greenish yellow, said second color is yellow and said first color changes to dark brown when the lens is irradiated.

6. The eyeglass lens as in claim 1, wherein the silver halide comprises about 0.6 weight % silver and about 0.4 weight % chlorine and said coloring material comprises $Ho_2O_3$ in a quantity of about 1.0 weight %, whereby said first color is amber yellow, said second color is yellow and said first color changes to dark reddish brown when the lens is irradiated.

7. The eyeglass lens as in claim 1, wherein the silver halide comprises about 0.4 weight % silver and about 0.6 weight % chlorine and said coloring material comprises $Er_2O_3$ in a quantity of about 1.0 weight %, whereby said first color is amber pink, said second color is pink and said first color changes to dark reddish brown when the lens is irradiated.

8. A process for producing an eyeglass lens having a photochromatic gradient and two color tones, comprising heat treating a glass containing a silver halide and a coloring material comprising at least one material selected from the group consisting of $Pr_6O_{11}$, $Nd_2O_3$, $Sm_2O_3$, $Ho_2O_3$, and $Er_2O_3$ so as to vary the particle diameter of the silver halide particles in a face direction of the lens, said silver halide having a composition such that the lens has a first color in an area showing photochromatic properties and a second color in another area, said first color changing when the lens is irradiated.

9. A process as in claim 8, wherein said step of heat treating comprises heat treating with a gradient temperature.

10. The process as in claim 8, further comprising covering a portion of the glass prior to said step of heat treating.

* * * * *